US011340799B2

(12) United States Patent
Zhdanov et al.

(10) Patent No.: US 11,340,799 B2
(45) Date of Patent: May 24, 2022

(54) DYNAMICALLY PRODUCING A COMPATIBILITY OF FILE SYSTEMS IN REAL TIME

(71) Applicant: Paragon Software GmbH, Freiburg (DE)

(72) Inventors: Ivan Zhdanov, Moskau (RU); Aleksandr Zudin, Freiburg (DE); Konstantin Komarov, Freiburg (DE)

(73) Assignee: Paragon Software GmbH, Freiburg (DE)

( * ) Notice: Subject to any disclaimer, the term of this patent is extended or adjusted under 35 U.S.C. 154(b) by 0 days.

(21) Appl. No.: 17/514,403

(22) Filed: Oct. 29, 2021

(65) Prior Publication Data

US 2022/0050607 A1 Feb. 17, 2022

Related U.S. Application Data

(63) Continuation of application No. PCT/EP2020/025548, filed on Nov. 30, 2020.

(30) Foreign Application Priority Data

Jun. 18, 2020 (EP) .................................... 20020284

(51) Int. Cl.
*G06F 3/06* (2006.01)
(52) U.S. Cl.
CPC ............ *G06F 3/0622* (2013.01); *G06F 3/067* (2013.01); *G06F 3/0655* (2013.01)
(58) Field of Classification Search
None
See application file for complete search history.

(56) References Cited

U.S. PATENT DOCUMENTS

| 5,463,772 A | 10/1995 | Thompson et al. |
| 5,742,818 A | 4/1998 | Shoroff et al. |

(Continued)

FOREIGN PATENT DOCUMENTS

| WO | 2005086039 A2 | 9/2005 |
| WO | 2018031794 A1 | 2/2018 |

OTHER PUBLICATIONS

International Search Report issued for corresponding International Patent Application No. PCT/EP2020025548, dated Feb. 26, 2021.

(Continued)

*Primary Examiner* — Edward J Dudek, Jr.
*Assistant Examiner* — Ralph A Verderamo, III
(74) *Attorney, Agent, or Firm* — Myers Wolin, LLC

(57) ABSTRACT

A method is provided for dynamically establishing a compatibility of file systems and file system independent access to data in real time. According to the method, it is possible for an end user to access a passive data memory with any terminal device without having to take into account the underlying file system of the passive memory. This avoids complex process steps which, for example, provide for a conversion of the file system directly on the storage medium. The proposed method is thus more efficient and error-resistant. Also provided is a correspondingly configured apparatus and system arrangement. In addition, a computer program product with control commands which implement the method steps is proposed.

14 Claims, 12 Drawing Sheets

(56) References Cited

U.S. PATENT DOCUMENTS

| | | | |
|---|---|---|---|
| 9,003,109 B1* | 4/2015 | Lam | G06F 3/0679 |
| | | | 711/103 |
| 9,015,439 B1* | 4/2015 | Verhaeghe | G06F 21/79 |
| | | | 711/163 |
| 2009/0116275 A1* | 5/2009 | Luc | G11C 17/10 |
| | | | 365/103 |

OTHER PUBLICATIONS

Ing, C. et al., "Heterogeneous File Sharing by File-System Emulation," Computer Systems Architecture Conference, ACSAC 2008, IEEE 13th Asia-Pacific, 2008, Piscataway, New Jersey, Aug. 4, 2008, pp. 1-4.

* cited by examiner

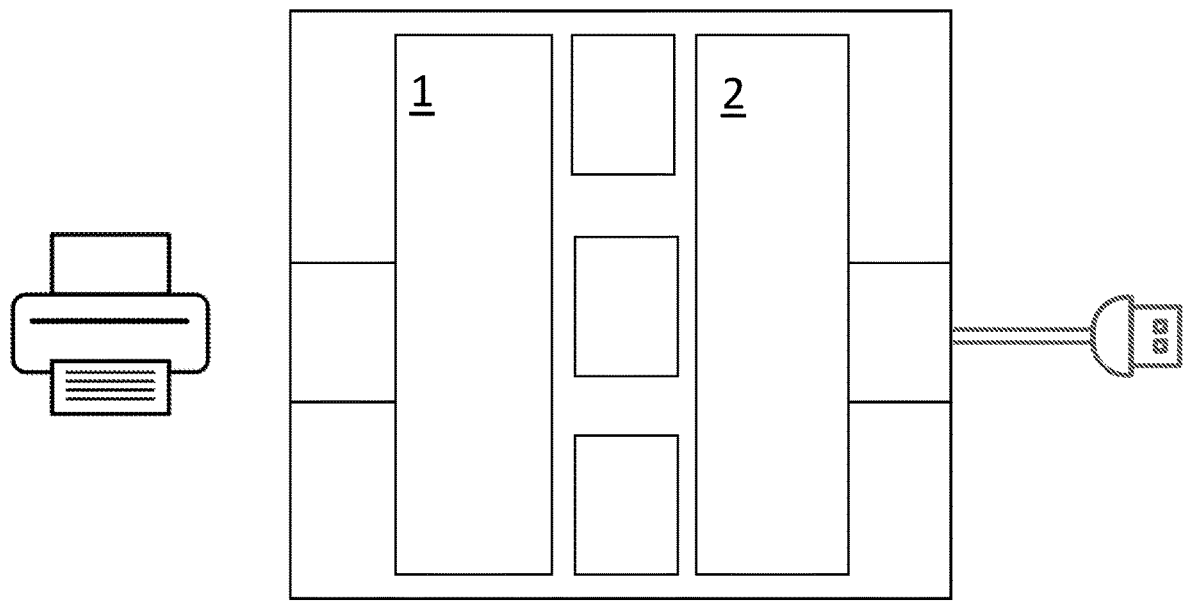
Fig.: 1

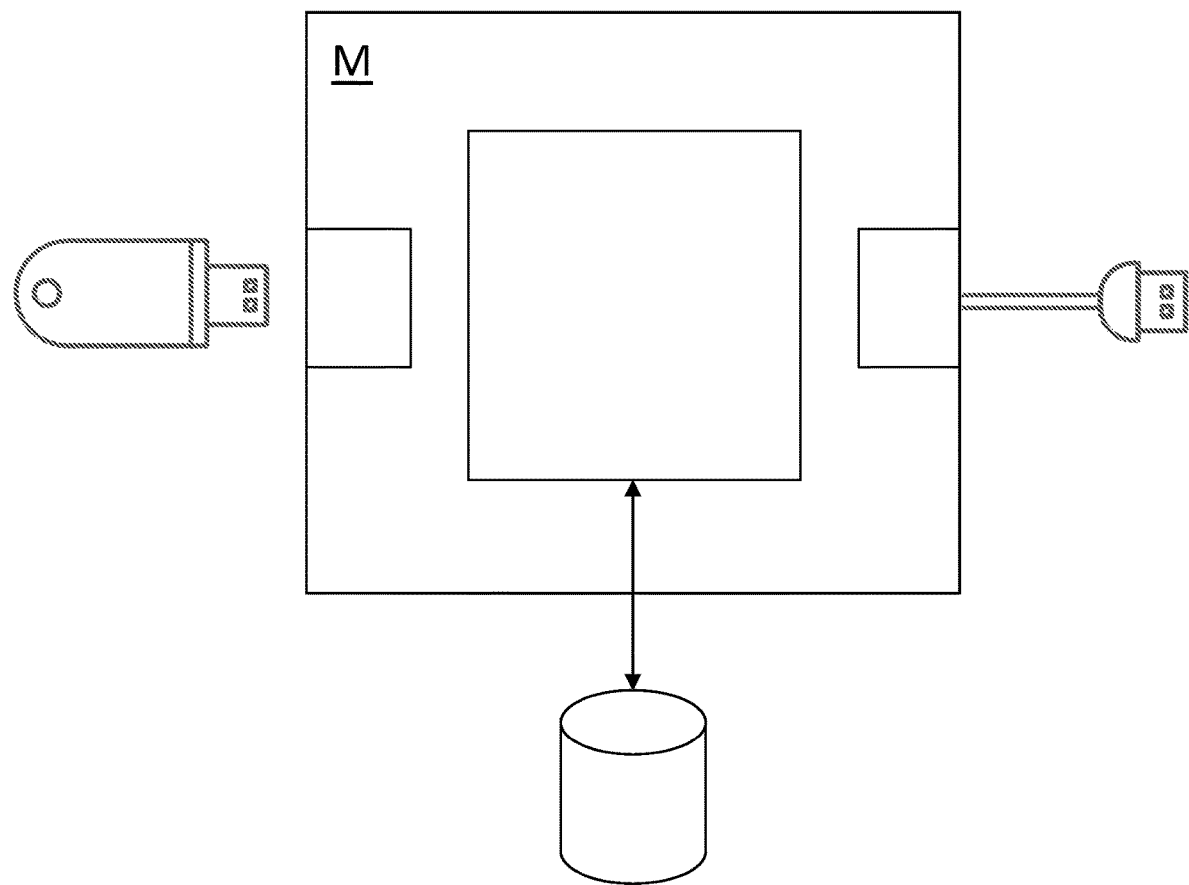
Fig.: 2

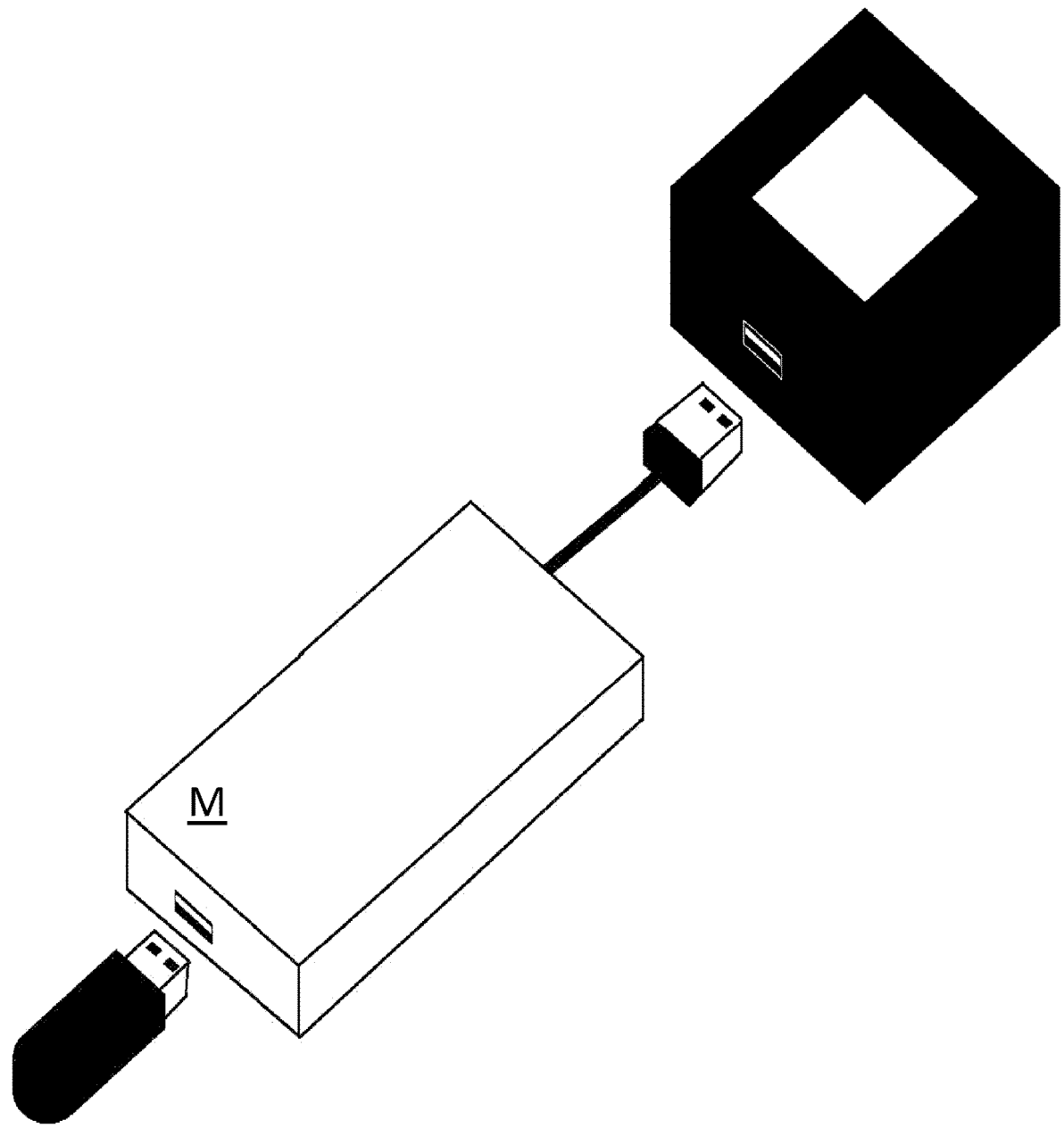
Fig.: 3

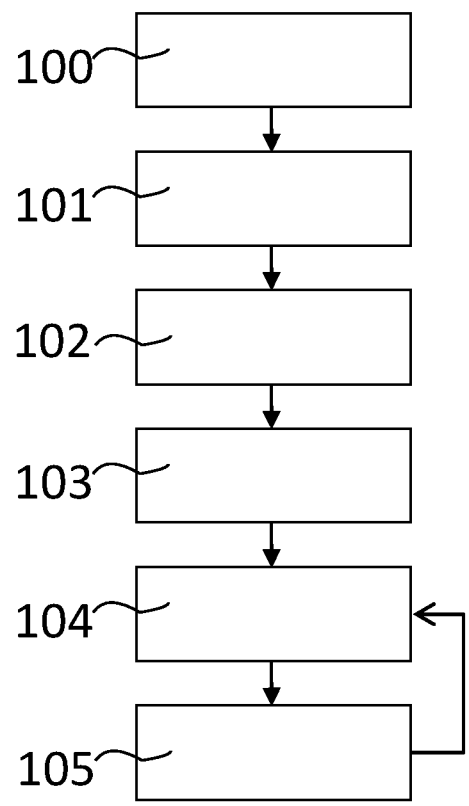
Fig.: 4

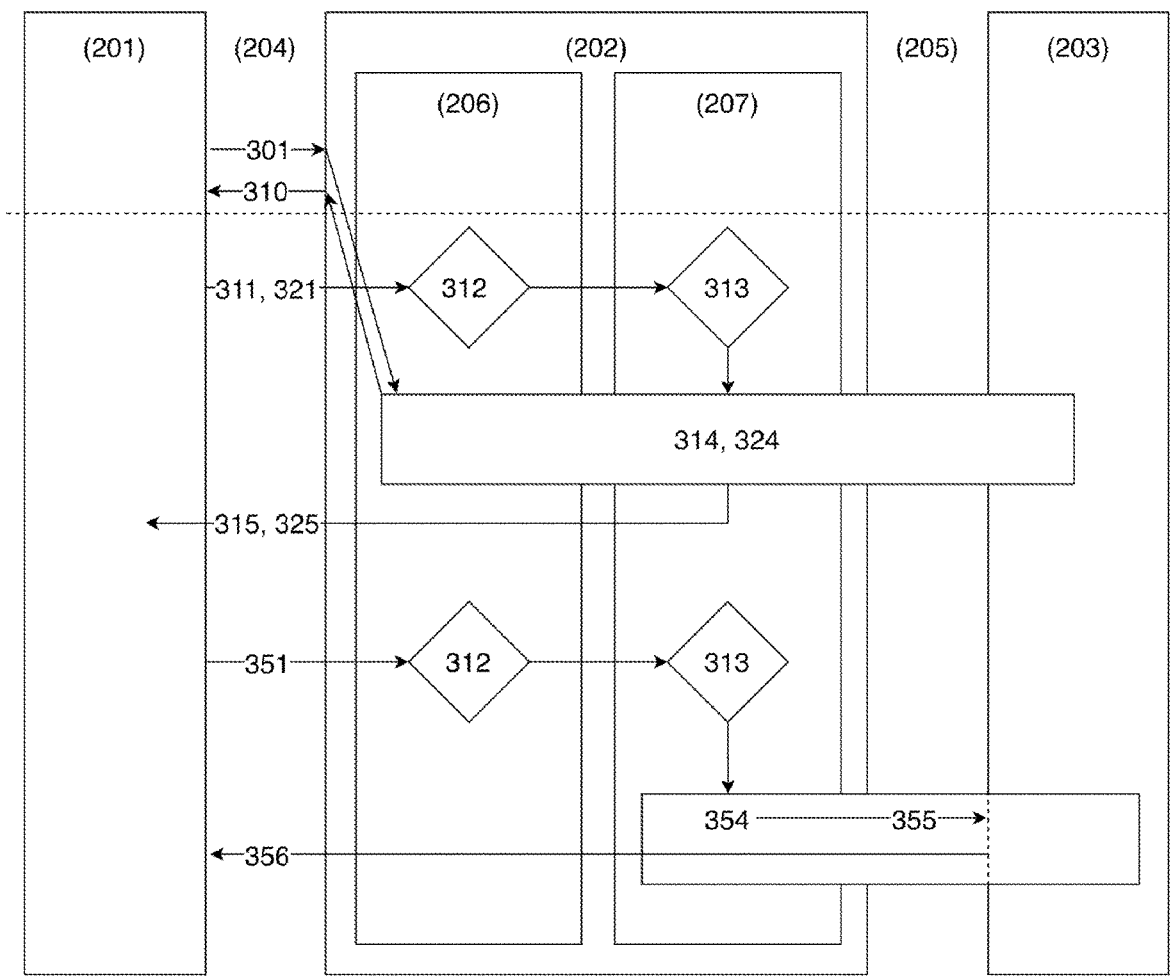
Fig.: 5

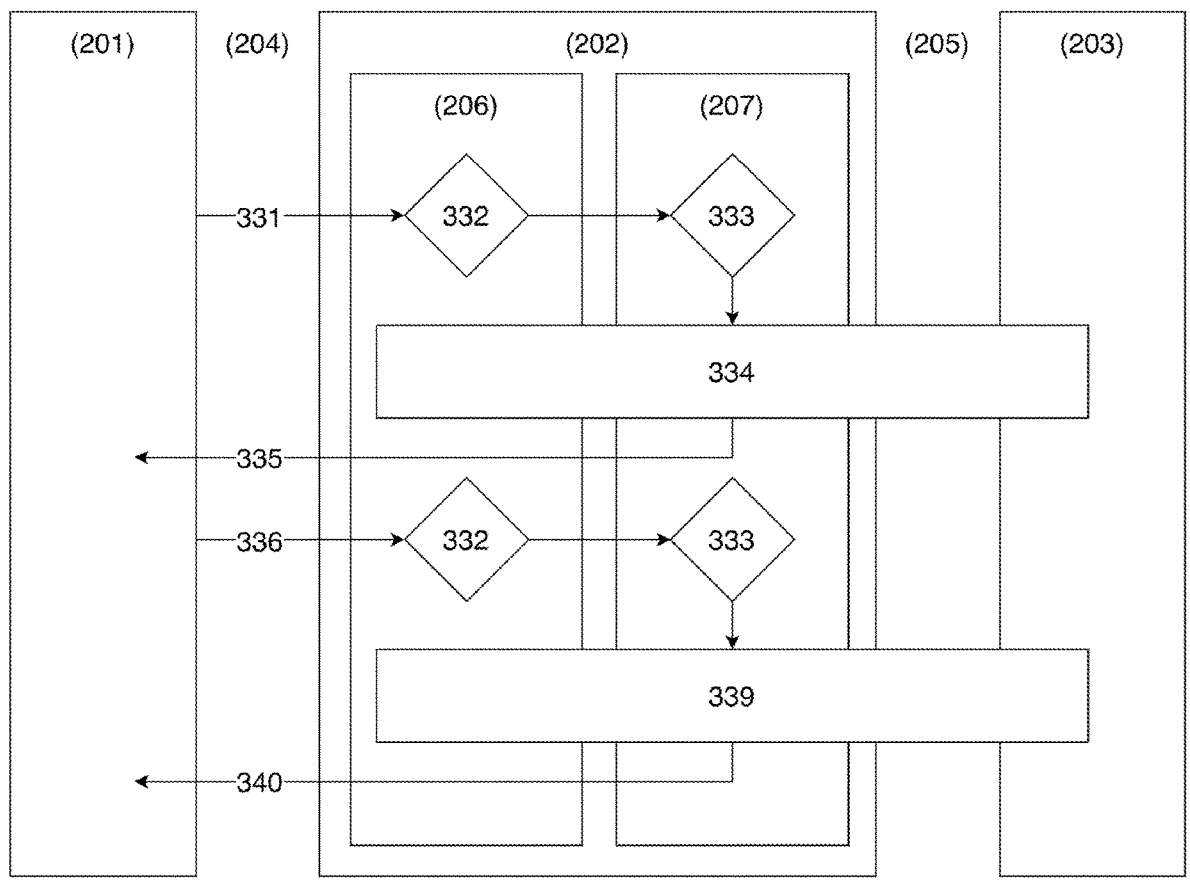
Fig.: 6

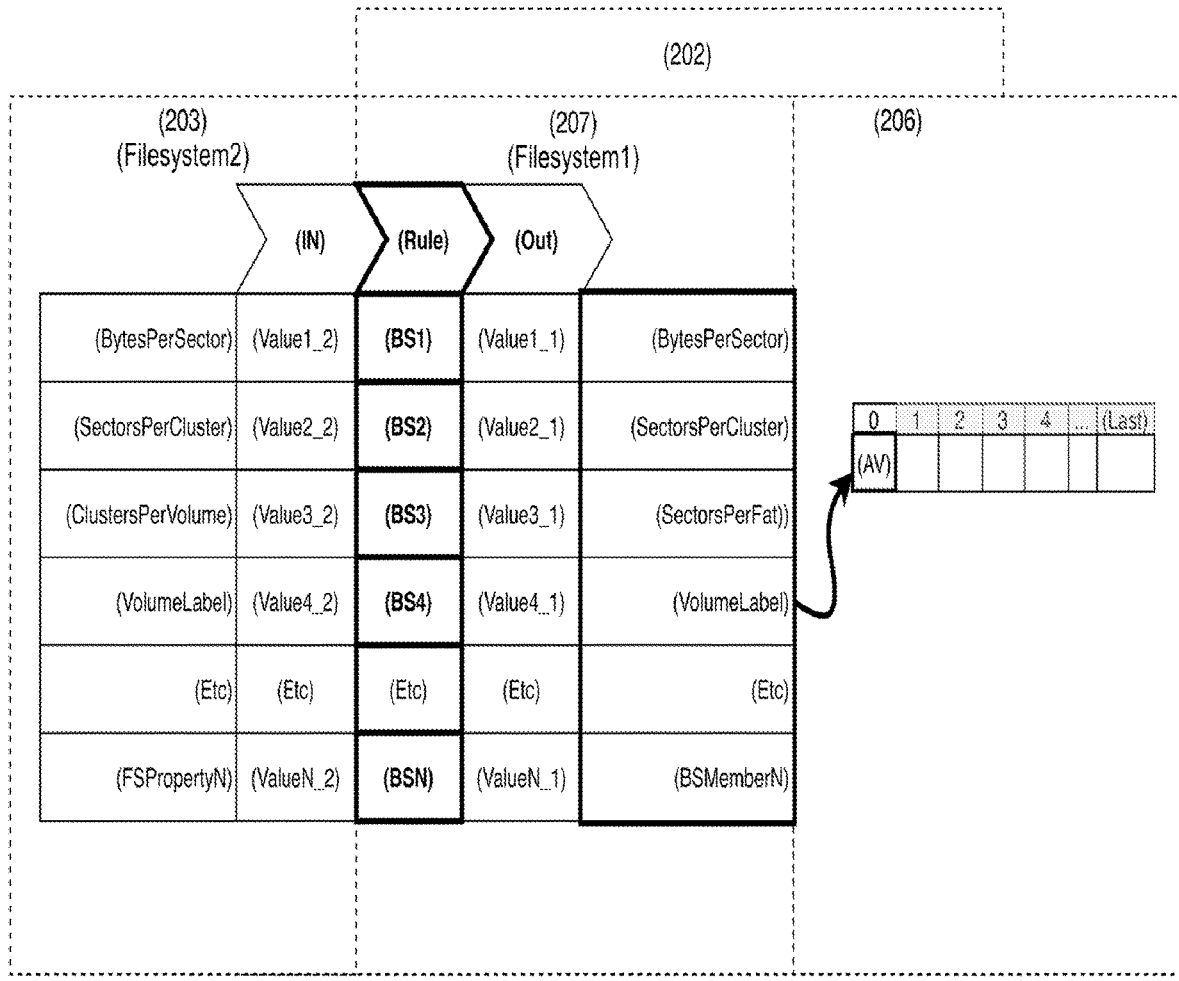
Fig.: 7

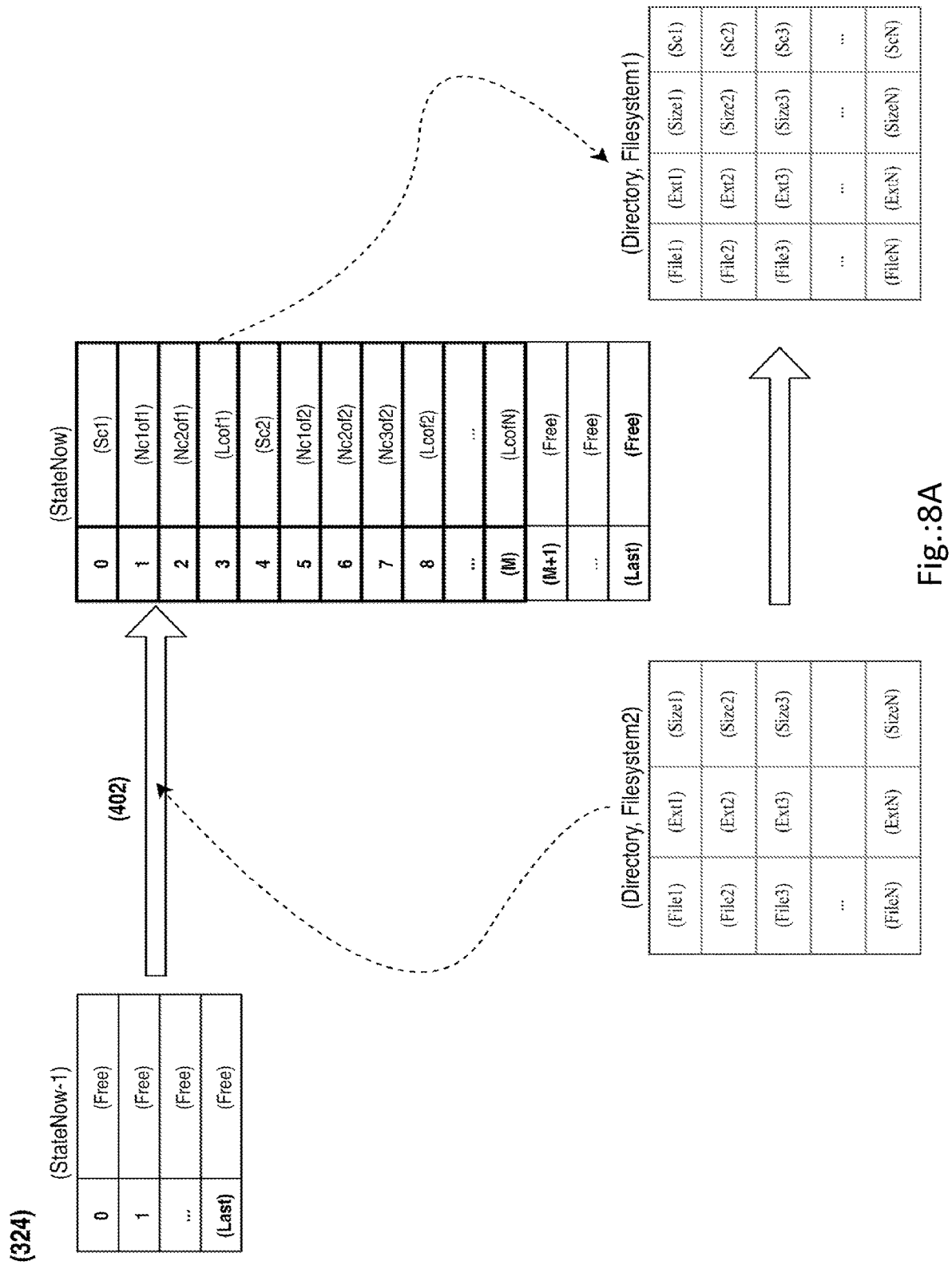
Fig.:8A

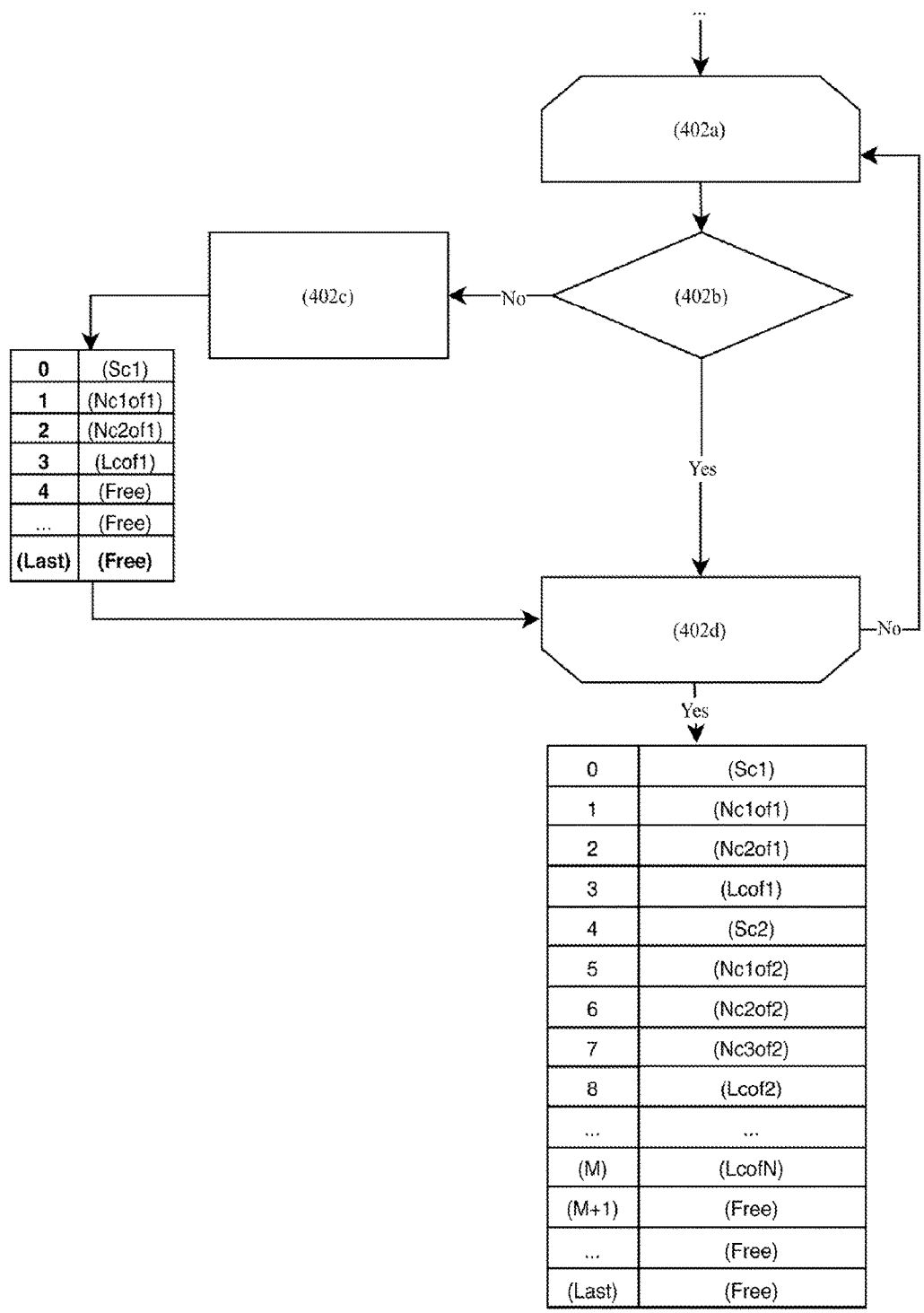
Fig.: 8B

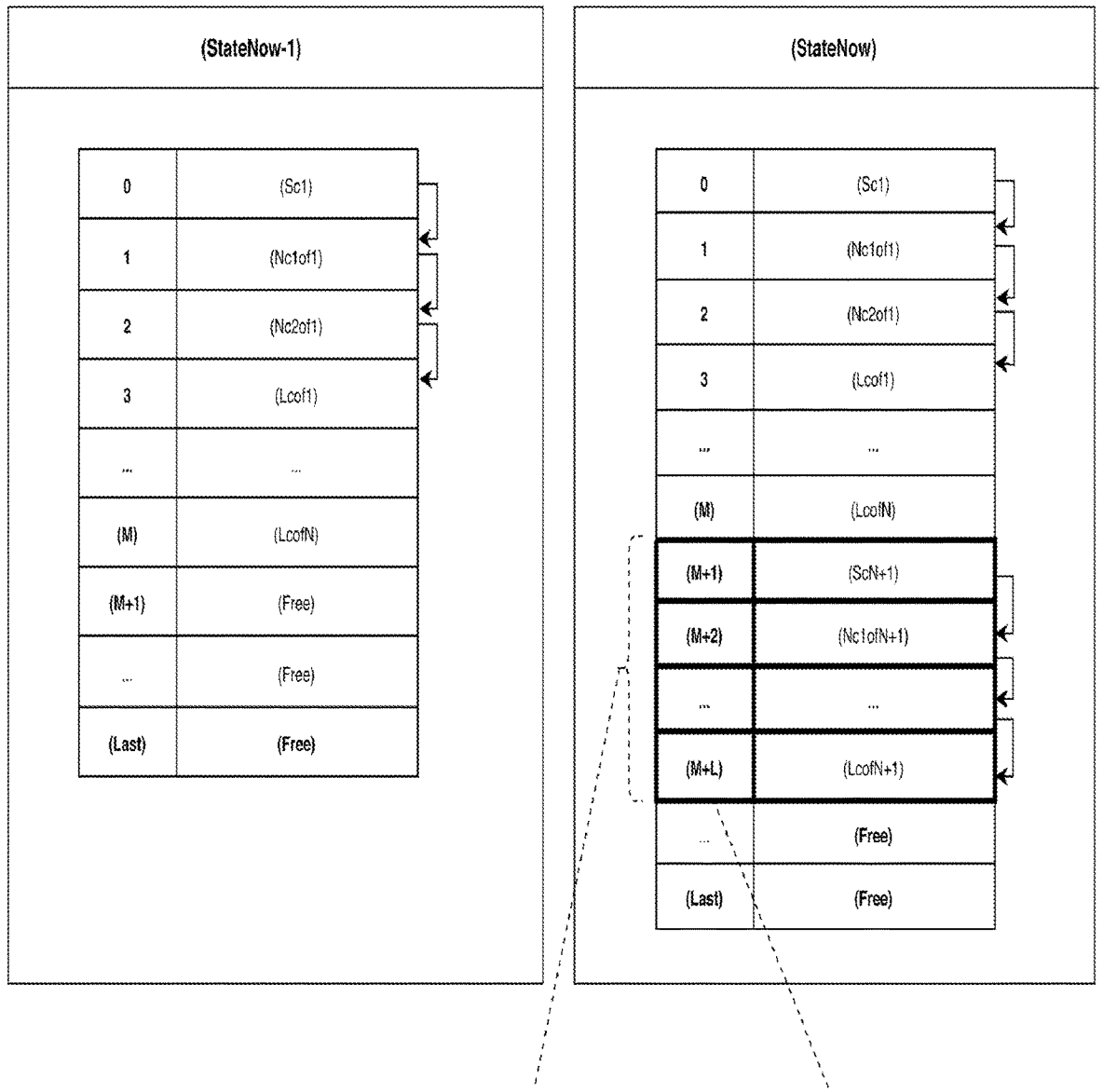
Fig.: 9A (406)

| (StateNow-1) | | | |
|---|---|---|---|
| (File1) | (Ext1) | (Size1) | (Sc1) |
| (File2) | (Ext2) | (Size2) | (Sc2) |
| (File3) | (Ext3) | (Size3) | (Sc3) |
| : | : | : | : |
| (FileN) | (ExtN) | (SizeN) | (ScN) |

| (StateNow) | | | |
|---|---|---|---|
| (File1) | (Ext1) | (Size1) | (Sc1) |
| (File2) | (Ext2) | (Size2) | (Sc2) |
| (File3) | (Ext3) | (Size3) | (Sc3) |
| : | : | : | : |
| (FileN) | (ExtN) | (SizeN) | (ScN) |
| XXX.ABC | (ExtN+1) | 19*512 Bytes | (ScN+1) |

(QualifiedDifferenceDIR)

Fig.: 9B

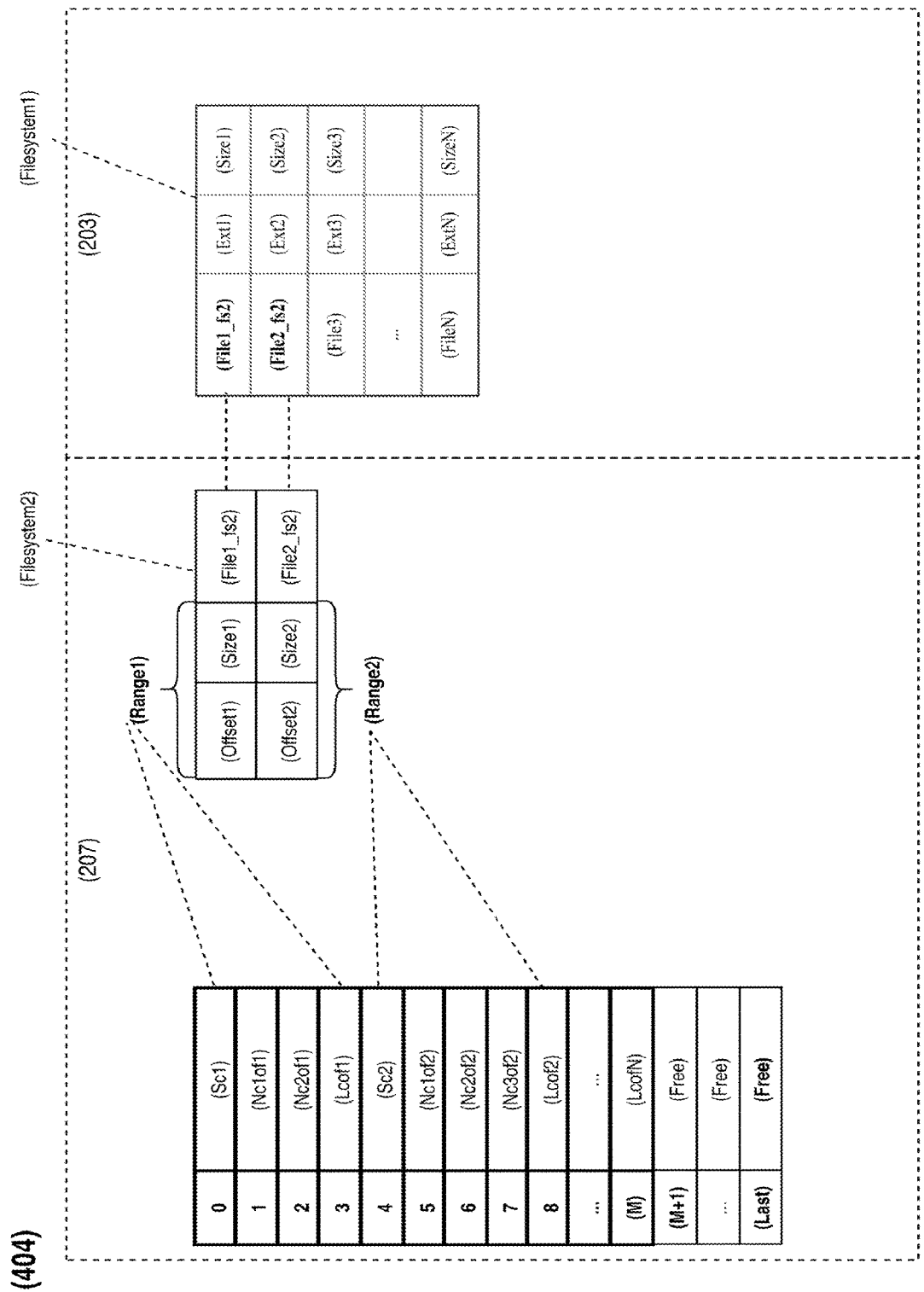
Fig.: 10 ial access to data in real time. According to the invention, it is possible for an end user to access a passive data memory with any terminal device without having to take into account the underlying file system of the passive memory. This avoids complex process steps which, for example, provide for a conversion of the file system directly on the storage medium. The proposed method is thus more efficient and error-resistant. The present invention is also directed towards a correspondingly configured apparatus and system arrangement. In addition, a computer program product with control commands which implement the method steps is proposed.

BACKGROUND

U.S. Pat. No. 5,463,772 A1 shows devices for reading and writing to an active data memory with a predetermined file system.

WO 2005/086 039 A2 proposes a method for producing storage media recorded with structured information and, for this purpose, proposes converting data and uses a universal data model.

WO 2018/031 794 A1 shows a method for writing to storage media.

U.S. Pat. No. 5,742,818 A shows a method for converting a file system.

The prior art deals with the problem that if a terminal wants to access a data memory, compatibility problems can arise. For example, the end device does not support a file system on the memory. The prior art suggests that in the event of incompatibility, i.e. with different file systems, the file system of the data memory is typically converted. The file system of the data memory is thus converted into the file system that is supported by the terminal. This is a complex process and the data on the storage medium is also lost.

The transfer or conversion from one file system to another file system is often carried out by formatting the entire data memory. Formatting is based on the fact that the entire data store is erased during the restructuring and is then empty at the beginning of a write operation. This leads to further problems, for example the need to back up data or the problem of possible data loss.

Furthermore, emulation is known in the prior art, where a functionality of a target system is imitated. The emulation is again a complex process and requires a considerable effort in providing an abstraction level of the underlying hardware and software of the target system. Emulating itself is often time-consuming. In addition, unnecessary functionalities are provided if a communication participant is a passive data memory. This typically does not offer extensive functionality, but the main task of the data memory is simply to act passively and only to store static data. Emulation is therefore also time-consuming and, if applicable, prone to errors.

The prior art thus has the disadvantage that no method is provided which allows an end user to connect a passive data carrier to a terminal in such a way that the underlying file systems are always compatible. Corresponding methods are complex and a complex conversion of the entire file system is typically carried out in a preparatory process step. However, this is felt to be disadvantageous for the user, since he typically wants to write to the data carrier in real time and thus does not want to accept formatting. If the user then is threatened to lose data, such procedures are not accepted.

It is therefore an object of the proposed invention to provide a method which enables the user to connect a passive data storage device to a terminal without causing problems with the compatibility of file systems. A file system independent data access should therefore be possible, which does not entail any loss of data and can also be carried out in real time. It is also an object of the present invention to propose a correspondingly configured device and a correspondingly configured system arrangement. In addition, a computer program is to be proposed with control commands which implement the method or operate the device or the system arrangement.

SUMMARY

A method is provided having the features of the claims. Accordingly, a method for dynamically establishing a compatibility of file systems and access to data independent of the file system in real time is proposed, comprising granting access to the file system of a passive data memory device for an active terminal device and a modeling device which is communicatively connected in between the passive data memory device and the active terminal; receiving an access request from the active terminal by the modeling device, wherein the access request specifies access data and access operations on the passive data memory; a recognition of the file system of the passive data memory by the modeling device; selecting stored access rules which are suitable for carrying out the access request in accordance with the recognized file system of the passive data memory; applying the selected access rules by the modeling device to access data specified by the access request; and performing the access operations in accordance with the access request.

According to embodiments of the invention, a dynamic establishment of a compatibility of file systems takes place in such a way that the hardware of the data carrier is not emulated, but rather an adaptation is made on the data level or file level in such a way that data from the terminal can be written to the passive data memory. Hardware is not simulated, but rather work is accomplished on file level, for which emulation is not necessary. A passive data memory also does not have any software, so that no functionality has to be mapped here either. The data memory typically only offers passive read operations or write operations. This makes it possible for the proposed method to work in real time.

According to embodiments of the present invention, real time means that there are no significant latencies, that is, that the user does not notice any delay from his point of view. The individual process steps can be processed in a fraction of a second, so that the end user feels that the process is being carried out in real time. From a technical point of view, there is of course a processing time which, however, cannot be subjectively perceived by a human user.

According to embodiments of the invention, the method avoids the need to emulate or transfer file systems in a preparatory method step. Thus, the end user can couple the storage medium or the passive data memory to the terminal by means of the modeling device and immediately begin reading and writing operations on the data memory. This means that data in the data memory can be accessed independently of the file system. Access to data means that both read operations and write operations on the data carrier are supported.

To do this, it is necessary to grant access to the file system. Granting access is also referred to as a MOUNT operation. Here it is possible to read out the file system of the passive data memory and to already recognize which data is on the data memory. This does not require any significant expenditure of time, so that from the user's point of view this process step can also be carried out in real time, i.e. without waiting times. By granting access to the file system, the data memory is communicatively coupled to the active terminal, the modeling device being interposed. Granting access includes, for example, establishing a plug connection between the data memory, the modeling device and the active terminal.

The plug connection can be made in such a way that the passive data memory is plugged directly into the modeling device and this in turn is plugged into the active terminal. However, it is also possible to provide a wired connection between the data memory, the modeling device and the terminal. According to one aspect of the present invention, access is granted by means of a physical connection between data storage device, modeling device and terminal. A person skilled in the art knows common formats for this and how such a plug connection is to be designed. USB can be used as an example, so that common interfaces can be used for this purpose. A passive data storage device can therefore be an external hard drive or a USB stick or SD card slot.

The modeling device can be designed as its own hardware device and can, for example, have a data memory that contains access rules. The modeling device can also be implemented as an embedded system which provides or executes the control logic. In general, the modeling device comprises at least two interfaces, the passive data memory communicating with the modeling device via an interface and the active terminal communicating with a further interface. In general, however, it is also possible to provide further interfaces so that several data memories can be connected. It is also possible to connect several active end devices so that they write to or read from the data memory.

The passive data memory does not provide any functionality, but only serves to store data and can consequently be referred to as passive. The corresponding write operations and read operations are initiated and transmitted by the active terminal. The active terminal thus initiates the method according to embodiments of the invention and would like to access the passive data memory. The active terminal keeps data ready which are stored in accordance with the underlying file system or requests data which are stored on the passive data memory. According to embodiments of the invention, the corresponding data are adapted as a function of the supported file system of the active device.

In general, the active terminal supports a first file system, the passive data storage device having a second file system. If data is now written to the passive data memory, the data in the first file system format are adapted in such a way that they are to be stored in the second file system format. If data are requested from the data memory, the corresponding data are adapted from the second file system format in such a way that they correspond to the first file system format. Typically, it is not necessary to adapt the user data for this purpose, only the additional data have to be adapted. For example, metadata can be modeled in such a way that they can be written to the data memory or stored on the active terminal. The additional data can be data that describe the user data or provide information relating to the file system. It can happen that the additional data describe an offset that specifies where the corresponding data blocks are physically stored on the storage medium.

The modeling device therefore accepts an access request from the active terminal, the access request specifying access data and access operations to the passive data memory. The access operations can either be read operations or write operations, while the access data describe what exactly is to be queried or transmitted. The access data can, for example, specify a file name that is to be written to the data memory in accordance with the "write" access operation. The access request is initiated by the active terminal and specifies the desired data without going into the file system.

The file system of the passive data carrier is then recognized by the modeling device. The modeling device mediates between the active terminal and the passive data memory. Thus, all messages or commands are passed through the modeling device. The connected communication participants, that is to say the active terminal and the passive data memory, thus communicate only via the modeling device.

Furthermore, there is a selection of stored access rules which are suitable for carrying out the access request in accordance with the recognized file system of the passive data memory. The stored access rules can be determined empirically, for example, or can be created in a preparatory process step. The access rules describe how data are to be modeled so that, starting from a first file system, they can be interpreted within a second file system. Additional data, for example metadata, is typically adapted here in such a way that files or data which are coded according to the first operating system are coded according to the second operating system. If, for example, a write operation takes place, the active terminal transmits the files in accordance with the first file system or file system format that is available on the active terminal. These are then modeled in accordance with the access rules in such a way that they can be stored on the second file system or file system format. If, on the other hand, a read operation takes place, the data of the second file system are modeled in such a way that they can also be interpreted by the active one. The data are thus converted in such a way that they can be saved on the file system of the active terminal.

The access rules can be selected in such a way that a table is kept which describes the file system of the active terminal in the first column, describes the file system of the passive data memory in the second column and specifies in a third column which access rules are provided. The third column can hold a pointer that points to the corresponding access rules. FAT, FAT32, ExFAT, NTFS or others can be used as the file system.

The data memory with the access rules is typically built in the modeling device or it is also possible for the data memory to be present as an external data memory that is read out. In this way, the data memory can also be held by the active terminal.

The access rules therefore describe rules on how to adapt the data to be written or read so that they are compatible in each case. That is, it can be provided that the access data are analyzed in such a way that payload data are separated from other data and the other data are adapted according to the file system. It is optionally provided that the user data are also adapted, with only the additional data or the metadata being adapted in a typical case. It is thus possible to carry out the modulation process very efficiently and it is in turn possible to carry out the method in real time. The conversion of the additional data can therefore be carried out quickly, since it is not the file system that is adapted but the data and, for the data, typically only the metadata. This is only a very small amount of data, which can be adapted without great technical effort.

If the access rules are selected, they are applied to the access data, which means that the data to be read or written are adapted in such a way that they can be written to the file system of the passive data memory or, if data are read, they are adapted so that these correspond to the file system of the active terminal device. As has already been described, it is often sufficient to simply code or model additional data and not the payload data.

Since the data have now been transformed in a compatible manner, it is possible to initiate the actual step of performing the access operations. The access operations can be either read operations or write operations. Since the data are now appropriately available, they are written to the passive data memory or read from the passive data memory.

The method steps can be carried out iteratively in such a way that the selected access rules are applied and the access operations carried out for a defined data stream. For example, a set of files can be requested by the active terminal and it can be determined according to the access operations whether a one-time adjustment of the access data is sufficient or whether, for example, the access rules must be reapplied after each write operation of a file. This means that the metadata can be adapted for each file or the metadata is only adapted once and all user data is overwritten. How to proceed here can be stored in the data memory of the modeling device.

According to one aspect of embodiments of the present invention, granting access comprises a mount process, incorporating the passive data carrier into the modeling device, incorporating the passive data carrier into the active terminal, communicative coupling, establishing at least one plug connection, activating an access, setting up access rights and/or data communication. This has the advantage that the data memory can be read out when access is granted, and it is therefore possible to estimate the available data during a read operation. Thus, for example, file sizes are known and it can be determined how the data stream to be read is structured. Depending on this information, the application of the selected access rules and the implementation of the access operations can be optimized. If, for example, there are many smaller files, individual groups of files can be read as a data stream and the application of the selected access rules therefore relates to several files. If the files are large, the access rules can be applied to each file. The communicative coupling ensures that the active terminal communicates with the passive data memory via the modeling device. It is also possible to implement additional security mechanisms, for example access rights can be assigned.

According to a further aspect of embodiments of the present invention, the active terminal has an operating system that generates the access request. This has the advantage that the data streams can be specified in advance and it is therefore known which files are being requested. In this way, the operating system can indicate that a large number of files are to be read or written, and the selected access rules can therefore also be applied to one or more files. The access data can consequently be segmented and adapted in one piece or individual segments, i.e. individual data streams, can be adapted. In this way, small amounts of data can be summarized and the access rules are applied once. This means that these files can be written and additional data does not have to be adjusted every time.

According to a further aspect of embodiments of the present invention, the application and implementation are carried out iteratively for each data stream, the operating system defining the data stream. This has the advantage that the application of the access rules and the execution of the write operations can be carried out as often as desired, so that after the last iteration all access data are read or written. Thus, the data streams can be selected depending on the requested or specified files.

According to a further aspect of embodiments of the present invention, the access request has at least one read and/or write request. This has the advantage that the passive data memory can be accessed both for reading and writing. It is not necessary here to emulate a functionality of the passive data memory, but rather an adaptation of the (meta) data to be written or read takes place according to the invention and there is no direct adaptation of the file system on the passive data memory.

According to a further aspect of embodiments of the present invention, the access request specifies payload data and/or additional data. This has the advantage that the access request already specifies which data are user data and which are additional data. Additional data can be present, for example, as metadata that describe the useful data. Such additional data are the size of the file or a file name. If a file system does not support certain additional data, for example a different character set is used, the application of the access rules takes place in such a way that the file name is changed so that it matches the character set of the file system. For example, the active terminal wants to write files to the passive data memory and specifies user data with file names with umlaut. If umlauts are not supported on the file system of the data memory, the access rule provides, for example, that umlauts are replaced by another vowel or by a vowel and an "e".

According to a further aspect of embodiments of the present invention, access data describe file names, absolute memory addresses, relative memory addresses, file types and/or file properties. This has the advantage that the access data describe which information potentially needs to be adapted. If the memory system of the passive data memory only supports certain memory addresses or only has a certain size, the transmitted memory addresses are adapted so that the access data can be written to the data memory. If files are read, these access data can be adapted in such a way that they can be saved on the file system of the active terminal.

According to a further aspect of embodiments of the present invention, access operations describe read and/or write operations. This has the advantage that the access operations describe how the individual operations are to be carried out. How to read or write can be described for each file system.

According to a further aspect of embodiments of the present invention, the access rules describe modulation operations which specify how additional data of access data are to be modeled so that the access data are to be read and/or written in accordance with the file system. This has the advantage that the access rules show transformation rules or modulation rules that transform certain access data in such a way that, if they are encoded with respect to a first file system, they are recoded in such a way that they are compatible with a second file system.

According to a further aspect of embodiments of the present invention, access rules describe how data according to a first file system is to be written into a second file system and/or read from a second file system. This has the advantage that a transformation can take place from a file system, which can be present on the active terminal, and a file system, which is present on the passive data memory. The access rules thus describe coding data or describe the process of how additional data are to be adapted. Typically, only the additional data have to be adapted and not necessarily the payload data.

According to a further aspect of embodiments of the present invention, the passive data storage medium comprises a storage medium, a USB stick, a hard drive, a memory card, a server, a network component, a DAS, a NAS and/or a local data storage device. This has the advantage that conventional specifications can be used again and a large number of storage media can also be used. It is also possible here for several passive data memories to be addressed. NAS stands for Network Attached Storage. DAS stands for Direct Attached Storage.

According to a further aspect of embodiments of the present invention, the active terminal is a television device, a printer, a router, a DAS, a NAS, a portable terminal, a stationary terminal, a computer, a telephone or a network component. This has the advantage that the active terminal can be implemented in a variety of ways and a generic method is created which makes completely different file systems compatible.

Another aspect of embodiments of the present invention is its ability to differentiate access requests and decide whether to request access to user content or to metadata. Depending on the type of access request, the request is then either forwarded to the passive memory without data modifications or the metadata is brought into the appropriate format using the translation rules.

Another aspect of embodiments of the present invention is its ability to retrieve only part of the metadata from the passive memory in order to send a feedback to the terminal. In this way, only the most necessary information on the requested files is provided in real time and with a short response time.

Another aspect of embodiments of the present invention is its ability to make only a specific part of the passive memory (usually a specific subdirectory with its contents) available as a separate memory, which can then be provided by the terminal.

Another aspect of embodiments of the present invention is its ability to make a preselection and thus the decision as to which file system is made available to the terminal. This is done either via a switch or by using preset files on external media, such as makeas.exFAT, which instructs the modeling unit to create an external memory with an exFAT file system. In this way, the modeling unit can make the exFAT file system available to the end device, because this file system has been widely used since its specifications became publicly available (the open source implementation of exFAT is supported by the developers of Microsoft Corporation) and is in use in a whole range of embedded devices, cell phones, and other multimedia devices.

Another aspect of embodiments of the present invention is its ability to compensate for serious disadvantages of FAT32 when this file system is used on the terminal. A big disadvantage is the limitation of the file size, which is 4 GB with FAT32. FAT32 specifies a further limitation for the number of addressable files in the same subdirectory, this is 65534. An external medium that was provided with FAT32 is most likely supported by older models of end devices and their limitations can also be taken into account for the user/the user can continue to work with it. Embodiments of the present invention deals with the problem represented by large files in such a way that it makes several files with the maximum permitted size of 4 GB available for the terminal.

The second limitation of FAT32, namely the maximum number of addressable files in the same subdirectory 65534, affects usage if all files are in the same directory or subdirectory. Although it is very unlikely that information will be retrieved from a subdirectory with more than 65534 files, in such a case embodiments of the present invention will inform the user that the limit has been reached and these 65534 files cannot be accessed at the same time. In this way, the user knows that not all files can be displayed on the device, but are still available.

According to one aspect of embodiments of the present invention, it is assumed that the terminal exclusively supports FAT32. Support for FAT32 in the end device applies if its modules or components (e.g. installed file system drivers) are able to address local, external or virtual memories with FAT32 format in order to create, restore, update or delete files and directories.

The memory is defined according to one aspect of embodiments of the present invention as a block device, which means that basic operations are provided by means of blocks—read and write blocks, which are addressed by an offset or via the position in the memory. It is assumed that the end device has a USB interface for connection to external storage media.

The assumption of FAT32 support in the terminal generally only serves demonstration purposes and is not aimed at limiting the possible uses of the proposed invention to the FAT32 system. The assumption that the terminal has a USB interface for the connection to external storage media also serves the purpose of illustration and does not aim to limit the possible uses of the proposed invention to a USB interface connection. If appropriate standards such as FAT or FAT32 are mentioned here, this generally stands for a file system.

The object is also achieved by a modeling device which can be interconnected communicatively between a passive data memory and an active terminal and is set up to grant access to the file system of a passive data memory for an active terminal, the modeling device also being arranged for receiving an access request from the active terminal, wherein the access request specifies access data and access operations to the passive data storage device, and is further set up to recognize the file system of the passive data memory, and a database unit being arranged to select stored access rules which are suitable for accomplishing the access request according to the recognized file system of the passive data memory, and the modeling device is further set up to apply the selected access rules to access data which are specified by the access request; and is further configured to cause the access operations to be carried out in accordance with the access request.

The modeling device is suitable for use in the proposed method. Furthermore, the modeling device can be used in the proposed system arrangement.

The object is also achieved by a system arrangement for dynamic establishment of compatibility of file systems and access to data independent of the file system in real time, having at least one interface unit set up to grant access to the file system of a passive data memory for an active terminal and a modeling device that supports the passive data memory and the active terminal is communicatively connected in between; the modeling device is set up to receive an access request from the active terminal, wherein the access request specifies access data and access operations to the passive data memory; the modeling device is set up to recognize the file system of the passive data memory; a database unit set up for selecting stored access rules which are suitable for carrying out the access request in accordance with the recognized file system of the passive data memory; the modeling device is set up to apply the selected access rules to access data which are specified by the access request; and the passive data memory configured to perform the access operations in accordance with the access request.

The object is also achieved by a computer program product with control commands which execute the method and operate the proposed arrangement when they are executed on a computer.

According to embodiments of the invention, it is particularly advantageous that the method can be used to operate the proposed devices and units or the system arrangement. The proposed devices and devices are also suitable for carrying out methods according to the invention. Thus, the device or the system arrangement in each case implements structural features which are suitable for carrying out the corresponding method. The structural features can, however, also be designed as method steps. The proposed method also provides steps for implementing the function of the structural features.

BRIEF DESCRIPTION OF THE DRAWING

Further advantages, features and details of the invention emerge from the following description, in which aspects of the invention are described in detail with reference to the drawings. The features mentioned in the claims and in the description can be essential to the invention individually or in any combination. The features mentioned above and those detailed here can also be used individually or collectively in any combination. The terms "left", "right", "top" and "bottom" used in the description of the exemplary embodiments relate to the drawings in an orientation with normally legible figure designation or normally legible reference symbols. The embodiments shown and described are not to be understood as conclusive, but are exemplary for explaining the invention. The detailed description is provided for the information of those skilled in the art; therefore, in the description, known circuits, structures and methods are not shown or explained in detail in order not to make the present description more difficult to understand. In the figures show:

FIG. 1: a schematic block diagram of a known system arrangement;

FIG. 2: a schematic block diagram of a system arrangement for dynamically establishing a compatibility of file systems and access to data in real time that is independent of the file system, according to an aspect of embodiments of the present invention;

FIG. 3: a schematic block diagram of a system arrangement for dynamically establishing a compatibility of file systems and access to data in real time that is independent of the file system, according to a further aspect of embodiments of the present invention; and FIG. 4: a schematic flow diagram of a method for dynamically establishing a compatibility of file systems and access to data in real time that is independent of the file system according to a further aspect of embodiments of the present invention;

FIG. 5: a schematic flow diagram of method steps which can be carried out by the modeling device;

FIG. 6: a schematic flow diagram of method steps according to embodiments of the invention in order to service an access request;

FIG. 7: a schematic flow diagram of method steps according to embodiments of the invention of the modeling device for reading the file system parameters from the passive memory;

FIGS. 8A, 8B: tables to illustrate the method steps for applying the stored access rules according to one aspect of embodiments of the present invention;

FIGS. 9A, 9B: further tables to illustrate the method steps for applying the stored access rules according to a further aspect of embodiments of the present invention; and FIG. 10: tables to illustrate the method steps for using the stored access rules according to one aspect of embodiments of the present invention.

DETAILED DESCRIPTION OF THE PREFERRED EMBODIMENTS

FIG. 1 shows a system arrangement according to the prior art. A storage medium is located on the left side and a terminal device is located on the right side, only the plug connection being shown on the right. The modeling device is designed in such a way that the hardware is emulated both on the right-hand side and on the left-hand side. This is the case in the prior art because the device in the middle is suitable for forwarding control commands to peripheral devices. The prior art therefore typically does not provide a passive storage medium, but rather a peripheral device such as an input device can be connected here. The state of the art therefore also requires an emulation of functionality, which is not necessary according to embodiments of the invention.

As can be seen from the present FIG. 1, it is particularly disadvantageous in the prior art that emulation is necessary by means of the emulator 1 on the left-hand side and the emulator 2 on the right-hand side. The state of the art therefore provides that all connected terminals must be emulated, which represents a considerable technical effort and is possibly even prone to errors.

According to embodiments of the invention, this disadvantage is overcome in the prior art and it was surprisingly recognized that adjustments are only necessary at the file or data level. In addition, the state of the art does not allow the establishment of the compatibility to take place in real time. If, for example, there is actually a storage medium on the left, the state of the art provides for the file system to be adapted here. According to embodiments of the invention, it is not the file system that is adapted, but only the data to be read or written.

FIG. 2 shows a system arrangement according to embodiments of the present invention. The passive storage medium is arranged on the left-hand side and the active terminal device, which is not shown here, is on the right-hand side. In the middle is the modeling device M, which is connected communicatively between the storage medium and the terminal. For this purpose, plug connections can be provided both on the left side and on the right side, or cables are provided in each case.

FIG. 2 also shows at the bottom a data memory which stores the access rules and holds them to the modeling device M. The data memory can be arranged externally, with the data memory being built into the modeling device in a preferred embodiment. It is particularly advantageous compared to the prior art that, according to embodiments of the proposed invention that no emulation components 1, 2 need to be provided, but rather it is sufficient to provide a modulation unit. This is arranged centrally in the modeling device M.

FIG. 3 shows the proposed system arrangement in a further view, a plug connection being provided for the passive data memory on the left side and a cable connection being provided on the right side. This can also be solved differently and there can also be a cable connection on the left side. The interfaces used can be designed in accordance with conventional specifications. In a preferred embodiment, the interfaces are implemented as USB interfaces.

FIG. 4 shows, in a schematic flow diagram, a method for dynamically establishing a compatibility of file systems and access to data independent of the file system in real time, including granting access 100 to the file system of a passive data memory for an active terminal and a modeling device M, which corresponds to the passive data memory and the active terminal is communicatively connected between; an acceptance 101 of an access request from the active terminal by the modeling device, wherein the access request specifies access data and access operations to the passive data memory; a recognition 102 of the file system of the passive volume by the modeling device; selecting 103 stored access rules which are suitable for carrying out the access request in accordance with the recognized 102 file system of the passive data memory; applying 104 the selected access rules to access data specified by the access request; and performing 105 the access operations in accordance with the access request.

The person skilled in the art recognizes that the steps can have further substeps and in particular that the method steps can each be carried out iteratively and/or in a different order.

All of the following processes are described from the point of view of the end device, which is controlled by the user as the main actor.

FIG. 5 shows what actions the modeling device 202 can perform according to embodiments of the invention when the terminal device 201 generates read access requests. In the present case, the terminal supports FAT32 as a file system, which will be referred to as file system1 from now on.

According to one aspect of embodiments of the present invention, the access requests are made by means of a communication interface between the terminal and the modeling device: this is the USB interface 204.

According to one aspect of embodiments of the present invention, two methods are implemented in the modeling device. The method for holding the additional data 206 and the method for modeling data 207. If the data are read from the passive memory 203, this process is carried out by means of a communication interface 205. However, it is not essential that the passive memory also be connected via USB interface the modeling device is connected, the 205 can also be replaced by a data bus, so that the passive memory is implemented directly as a component of the modeling device.

According to one aspect of embodiments of the present invention, the sequence of events depends on which access requests the terminal has initiated, according to which the modeling device, to which the passive memory is already connected, is connected to the terminal. Depending on the version of the end device, this order may differ from the following illustrations.

According to one aspect of embodiments of the present invention, the terminal communicates with the modeling device in two ways: On the one hand, the component of the terminal's operating system that is responsible for USB devices should recognize the modeling device connected via USB as an external USB device of the "memory" type. On the other hand, the other component of the operating system should determine how the connected storage device is to be addressed on the logical level, specifically which file system can be recognized on the memory.

For the first communication using the USB protocol, it is at least necessary according to one aspect of embodiments of the present invention that the modeling device has essential parameters, e.g. reports the number of addressable blocks or the block size as necessary actions within the scope of the USB protocol support. For this purpose, a so-called identification request 301 could be initiated, which, however, is not mandatory depending on the implementation of the operating system. Specific actions in accordance with the USB protocol are not dealt with here, since this protocol can essentially be carried out by a person skilled in the art without any problems. It should only be noted that this first identification request already leads to the modeling device being able to align itself accordingly and the data necessary for processing such identification requests (the number of addressable blocks) to be kept available.

According to one aspect of embodiments of the present invention, the first necessary action on the part of the modeling device for this is to read the file system parameters from the passive memory 314, which is indicated in detail in FIG. 7. The file system on the passive memory, henceforth referred to as file system2, is recognized by the modeling device during the execution of 314, the data read out not being limited to satisfying the first identification request, but instead being first converted according to embodiments of the invention in such a way that they are used as boot sector data of file system1 are also kept in the modeling device 206. Thus, essential parameters for the identification request are also sufficiently determined (the number of addressable blocks, the block size), the modeling device fulfills 310 the identification request in accordance with the USB protocol.

In the next step, the terminal's operating system should determine how the connected storage device is to be addressed on a logical level, specifically which file system can be recognized on the storage device.

For this purpose, the terminal can generate at least one access request which is aimed at reading at least block 0 from the memory, because this contains the information for determining the file system.

In order to service this access request, the following actions can be carried out according to the invention, which are shown in FIG. 5 as an example.

The first access request 311 of the terminal is: read a sector, starting from position 0.

In the first step 312, according to one aspect of embodiments of the present invention, it is checked whether the requested data are already held in the modeling device. It cannot be ruled out that the identification request of the terminal 301 has not yet been made, but is replaced by the access request 311. Although the parameters of the passive memory would not yet be known to the end device when executing 311, this does not prevent the end device from generating the access request 311, because position 0 can always be read when the memory device is addressable. For purposes of illustration, it is assumed that the identification request according to 301 has not been made beforehand. The data for the first sector in position 0 are therefore not yet held in accordance with 206.

In the second step 313, according to one aspect of embodiments of the present invention, it is checked which data in the sense of the file system 1 is involved when a sector is read from position 0. The act 313 is therefore generally to be described in such a way that it is to be checked during the reading process whether it is additional data or user data and, if it is user data, from which file in the sense of the file system1 it originates.

Access rules are used for this. As shown above, access rules define how metadata from one file system is to be converted into metadata from another file system. These rules also define which areas of the file system, which are provided for the file system structures, correspond to the respective areas on the other file system, and thus make it possible to determine whether an access request involves additional data in the sense of metadata.

According to the present access rule 400, it involves special additional data, specifically a so-called boot sector, if a sector is read from position 0.

According to the access rules, a boot sector for file system1 is summed up 314 in such a way that all file system parameters (file system size, the size for logical blocks on the file system (so-called cluster), the starting position for the first directory, etc.) are already sufficiently determined. This presupposes that this data must be held available for the terminal device for the very first access 311 to be processed. Basically all parameters for the file system1 are derived or calculated from the respective parameters of the file system2 of the passive memory. The access rule 401 comprises this method, specifically it determines how the parameters of the file system 1 are to be calculated depending on the file system 2 for the respective file system 1/file system 2 combination and which specific access rule is used. The figure shows how this access rule for the boot sector 401 is applied. Such an application is unproblematic, because the file system size is known and the size of the logical blocks can be taken over from the file system2 (if this is not possible, additional access rules apply to the block size adjustment).

The modeling device has thus simulated and held the data for sector 0 in such a way that the terminal can use this to initiate further access processes.

According to one aspect of embodiments of the present invention, the specifically present query 311 is fulfilled when modeled boot sector data are provided.

The requested data 315 is provided via the communication interface (here: USB). The access request 311 is thus completed.

The fact that the first access request leads to the result that the block 1 read is a FAT32 boot sector determines further actions of the terminal.

In principle, according to one aspect of embodiments of the present invention, it can be assumed that if the first block is recognized as a valid boot sector with valid content (file system parameters), the operating system of the terminal device continues access requests in order to determine the file system on the memory provided by means of the USB interface. Such a process can also be referred to as a "probe", the purpose of which is to recognize the memory as a specific, logically organized file system and to expose its own logical interface (the so-called "mount point") within the operating system.

Alternatively, after the first access request has been met and the content of the first block proves to be a plausible boot sector, the terminal's operating system can also send a message (a so-called "broadcast") to its components or applications to inform them about the availability of the new one storage device. As a result, the responsible component and the file system driver can initiate another process, which is often referred to as "mounting".

Both alternatives lead to the same result, namely that the new memory made available is recognized as FAT32 and the operating system of the end device or at least one of the components or apps can address this as a logical file system.

According to one aspect of embodiments of the present invention, whether this file system is only mounted for read operations or also for write operations depends on the following factors: the operating system of the terminal, the scope of support for the respective file system and the task the terminal has for externally connectable storage media provides. The following explanations deal with the read-write mode. The case in which the file system is only mounted on the memory in read mode does not need to be dealt with separately, because the method proposed according to embodiments of the invention can be used all the more for read mode if it leads to the promised success in read-write mode.

Further access requests from the end device therefore depend on which tasks are planned in the event of the "A new memory is available" event. It may be that the terminal is executing a specific application which tries to read the content of the newly provided memory, which means that the content of the root directory is first accessed. If no application is started automatically, the user who connects the model device to the device undertakes further actions to call up the contents of the memory and begins with the act of "calling up the contents of the root directory" in order to then determine further steps of his own. To retrieve the contents of the root directory, the user could also enter terminal commands such as "dir" or "ls". At most, it can be expected that the terminal device will attempt to read the contents of the root directory with the next access request. In order to service this access request, the following actions can be carried out according to embodiments of the invention, which are also shown in FIG. 5 by way of example.

In accordance with one aspect of embodiments of the present invention, it is assumed that the root directory area starts at sector X, occupies the area of 100 sectors, and this has been determined by the rule applied to step 314. Accordingly, the second access request 321 will read: 100 sectors read, starting with sector X.

In the first step 312, according to one aspect of embodiments of the present invention, it is checked whether the requested data are already available. In the present case, the data are not yet available because the terminal has only read sector 0 up to now.

In the second step 313 a check is made as to which data in the sense of the file system 1 is involved if 100 sectors are read from position X onwards. Access rules are used for this.

According to access rule 400, this is what is known as the root directory if sector X is accessed for the modeled file system, specifically over the entire requested length (100 sectors).

So that the modeling device 202 can hold 206 the data for the root directory of the terminal, further access rules are applied in the following step 324 (see FIG. 9) in such a way that metadata are generated in real time for the files in the root directory of this system for the files in the root directory of this system file system1 root directory data format.

This metadata is therefore suitable for rewriting the files on file system2 in such a way that each component of the terminal that supports file system1 (here: FAT32) interprets them as if these rewritten files were held in the modeling device. According to embodiments of the invention, this metadata is stored 206 for current and future access requests from the terminal.

For the application of the access rule 324 it may be necessary to read out further metadata from the file system 2 in order to gain complete knowledge about which files of the root directory structure are addressable by the requested 100 sectors and what size they have, and also by the method 404 (see FIG. 10) to determine in which areas of the file system2 the files mentioned above are placed.

In the interim result: By modeling the root directory in the format corresponding to the file system1, more data than requested may be read out, which is harmless, because such data that is initially read out superfluously is kept available for further applications of the access rule.

The actually present read access request from the terminal from step 321 is fulfilled by providing 100 sectors modeled using the access rule.

The requested data is provided 325 via a communication interface (here: USB). The access request 321 is thus completed.

After the root directory contents have been made available for the terminal, its application can prompt the user to take further steps, such as opening files or selecting file contents for specific processes (printing, playback of video/audio files, etc.). At this point, the file content should be accessed from the external storage medium and the operating system component of the end device (or its file system driver) should generate requests to the mounted logical volume in order to retrieve the required content from the file.

According to one aspect of embodiments of the present invention, it is assumed that the contents of the file ABC.ZYZ are being accessed, and the file size is assumed to be 10 blocks.

In order to service this access request, the following actions can be carried out according to embodiments of the invention, which are also shown in FIG. 5 by way of example.

An access request 351 is initiated, which consists in reading 10 blocks from position Pos1, which correspond to the first cluster of the file ABC.ZYZ SC1 on the file system1.

These data have not yet been requested, so they are not yet available 206.

First of all, it must be determined whether this request involves user data or additional data 313.

The fact that this query is about user data already results from the fact that when modeling the FAT structures 402 to fulfill the query 321, the size of the ABC.XYZ file was taken into account and for its contents an uninterrupted modeled chain in the file allocation table is held.

That is to say, the modeling method 402 is suitable for placing existing files of the file system 2 on the modeled file system 1 in such a way that they are not fragmented, regardless of whether these files arise on the file system 2 from several divided content fragments.

It is therefore user data that was read out by means of the access request 351 data.

In a further step 354, according to one aspect of embodiments of the present invention, it is to be checked which user data is actually being accessed. It cannot be ruled out that the end device may make the access request for several files, not just for ABC.XYZ. This is determined by the method 404 (see FIG. 10), which determines which files on the file system 2 are actually involved when certain blocks in the sense of the file system 1 are accessed. This method 404 is therefore suitable for determining further actions that are to be undertaken in specific contexts for the accessed contents of different files. Such a context establishes that when certain blocks are read from the file system1 that correspond to user data, corresponding blocks to be read are always determined on the file system2. As a result, user data are read out by a corresponding access request 355 directed to the passive memory. The process 355 is repeated until all the data requested by way of the request 351 have been read out, if the requested content is not placed on the file system 2 as an uninterrupted chain.

The requested data is provided 356 via a communication interface (here: USB). The access request 351 is thus completed.

After the root directory contents have been provided for the end device, its application can prompt the user to take further steps, for example to save data generated on the end device on the mounted logical volume. If, for example, new documents are scanned in, the mounted logical volume can be selected as the target storage location.

It is assumed that the end device tries to create this user data as a file with the name XXX.ABC in the root directory on the file system1 after user data with a volume of 19 blocks has been generated on the end device, and the content of the newly created files XXX.ABC, starting with position Pos2.

It is further assumed according to one aspect of embodiments of the present invention that the terminal does not create an access request which aims to describe the file name and file size in the root directory of the file system1 for the new file if no user data has yet been defined, and such a request is only then made if all user data for this newly created data is described.

The reason for this assumption is the possibility that a method for optimizing read and write access requests is implemented on the terminal.

If it is assumed that the terminal tries to write user data before the metadata for the respective file is described by another access request, an uncertainty arises in the sense of method 404, which is that new blocks to be written cannot yet be assigned to a file. However, this pending state is ended at the latest when the terminal generates an access request aimed at updating the metadata for the newly created files on the memory.

In order to service this access request, the following actions can be carried out according to embodiments of the invention, which are also shown in FIG. 6 by way of example.

An access request 331 is initiated which consists of writing 19 blocks, starting with position Pos2, which correspond to SCN+1.

First, it must be checked 332 whether this data to be written is available 206. Since the data in position Pos2 was neither read nor written, it is also not yet available.

In the next step it is to be determined whether this request concerns user data or additional data 333. The action 333 is therefore generally to be described in such a way that it is to be checked during the writing process whether it concerns additional data or user data, and if it concerns user data, from which file in the sense of the file system1 it originates.

This cannot yet be clearly determined, because these blocks are neither held as metadata 206 nor have they been read as user data in the sense of 351. In the next step 334, according to method 405 (see FIG. 9), it is initially assumed that user data is involved and the blocks to be written are treated accordingly. This begins a so-called floating state, because the blocks cannot yet be assigned to a file. The modeling device will hold the data to be written as user data until further notice 206, but the completion of the write process is reported 335 via the communication interface 204. The access request 331 is thus completed.

It is assumed that when the root directory contents for file system 1 are updated, a further access request 336 is initiated, which is directed to writing a block beginning with position X+99. Specifically, it is the last sector of the root directory.

First of all, it must be checked 332 whether this data to be written is available 206. This is the case here, because the block in position X+99 was already modeled 324 and reserved 206 in step 321 as the root directory for the file system 1.

If a data block is already available and if it is metadata, the application of access rules can be used to determine 339 which specific changes are involved. A corresponding method is shown 406 in FIG. 9, which consists in qualifying changes in the root directory structure and defining them as an abstract description, from which it can be concluded which corresponding changes are to be made on the file system 2. This is a new entry for the XXX.ABC file, which did not previously exist in the root directory. This change can be described as if the end device wanted to create a new file called XXX.ABC with a size of 19 sectors, starting with Pos2. Such an abstract description of the action can also be similar to the Posix standard.

In a further step, according to one aspect of embodiments of the present invention, the specific change is to be applied to the file system2 by converting the abstract description into a corresponding request to the passive memory. As a result, an entry for the data XXX.ABC is created on file system2, which, however, does not yet specify the start position of this file on file system2, although the start position is already specified on file system1. It follows from this that in the pending state there is still an uncertainty within the meaning of 404 with regard to the assignability of user data of the specific files to the file system1. However, this uncertainty is resolved with an access request aimed at updating the area with FAT—this will be discussed later.

Finally, the fulfillment of the write process is reported 340 via a communication interface 204. The access request 336 is thus completed.

After the end device or its application has completed all the necessary user tasks, such as scanning documents and placing this data on the external medium or transporting other user-generated content, the external medium can be separated from the end device.

Some end devices explicitly request the user to unmount the external device in order to be able to guarantee data security for these processes. The user would then be solely responsible for a possible loss of data if he removed the external medium before the end device requested the execution of the unmount process, the completion of which was waited for and only then the separation of the external medium and end device would have taken place. Such a secure method of removing external storage is not easy to enforce as the standard because users tend to be impatient when it comes to separating an external medium from the end device. He does not expect to carry out an unmount process and wait, but rather wants to be able to simply pull out the external storage medium as soon as the device activities are complete and the device is in the idle state, which can be easily read on the end device. In order to meet these expectations of the user, the operating system of the terminal device usually supports a synchronization technology for the file system driver so that it can work with the external storage medium.

This technology always keeps the external storage medium up to date by emptying the contents of the file system data that are stored in the main memory of the end device—this is usually initiated by the operating system itself. This means the following: After the end device or its application has fulfilled its tasks, in which external storage media can be involved, and has switched to the idle state (and is waiting for further input or further instructions from the user), the file system driver or a similar component can Empty blocks that have not yet been written to the external medium—this ensures data security if the external storage medium is suddenly disconnected. Such a synchronization technique leads to further access requests to the external memory.

In order to facilitate such a read and write attempt by the FAT, the following actions can be carried out according to embodiments of the invention, such as reading the FAT from file system1.

It should be noted that the access request directed to reading the FAT occurs at the latest with the first attempt to read a file after mounting, or after the first attempt to access the subdirectory after mounting.

Since the FAT (FAT Allocation Table) is the table that defines the area placement of the files in terms of the file system1, such structures do not exist in any way on the file system2 and only arise through the application of access rules to the parallel structures of the file system2. As a result, FAT is held on the modeling device 202. In addition, such structures rewrite metadata not for individual files but for all files located on the file system1 and represent a type of additional data that is not user data.

However, the FAT324 is not modeled cumulatively for all files present on the file system2, but only for files requested 314 during the access request by specifying the file path directly), as long as no metadata describing its placement are modeled for this file. The result of such a modeling is the applicability of the method 404, which enables file user data to be assigned.

A corresponding method is shown in FIG. 9, which consists in qualifying changes 405 in the FAT and defining them as an abstract description, from which it can be concluded which corresponding changes are to be made on the file system2.

First of all, it should be noted that, according to the access rule 400, it can be determined without any problems whether this access request is in the area of the FAT.

It is assumed that the update of the FAT is aimed at at least mapping the allocation chain for the file XXX.ABC. Since the write operations on the end device are carried out in an optimized manner, it cannot be expected that the update of the FAT will only focus on a specific allocation chain for a specific file. Rather, it is expected that updates to the FAT for multiple files will be cumulative. Which changes are specifically intended can be determined 405 by comparing the status for the FAT.

This is a new entry for the XXX.ABC file, for which no allocation chain has yet existed. This change can therefore be described as if the end device wanted to create an uninterrupted allocation chain for the new file named XXX-.ABC, which includes 19 sectors, starting with (SCN+1).

In a further step, the targeted change is to be applied 405 to the file system2, in that this abstract description has to adapt the structures on the file system2, which manage the placement of the user data on the file system. This also means that there is no longer any uncertainty about the assignability of the user data in the sense of method 404, and these user data to be written according to request 331, which were still held in the modeling device, are now written into the corresponding position of the passive memory can.

As a result, not only is an entry for the data XXX.ABC created on file system2, as was done when query 336 was processed, but the placement of file XXX.ABC is also specified, both on file system1 and on file system2.

Finally, the completion of the write process is reported via the communication interface 204. The access request for FAT is thus completed.

Finally, it should be noted that the actions of a terminal device performed elsewhere can take place in a different order and all changes to the file system1 always result directly in an access request. As a result, the above-mentioned actions of the modeling device do not change, since the always sequential updating of the file system 1 results in the pending state in the sense of the method 404 being excluded.

LIST OF REFERENCE SYMBOLS

1 emulator 1
2 emulator 2
M modeling device
(100)-(105) see detailed description
(201) Terminal
(202) Modeling Device
(203) Passive storage
(204) Communication interface (201)-(202)
(205) Communication interface (202)-(203)
(206) Procedure for holding the additional data
(207) Techniques for modeling data
(301), (310), (311), (312), (313), (315), (325), (351), (355), (356)—see detailed description.
(314) Modeling of the boot sector structure and file system parameters
(324) Modeling of the directory data
(354) Specification of the user data when reading
(331), (332), (333), (335), (336), (349)—see detailed description.
(334) Specification of the user data when writing
(339) Qualification of the metadata changes
(314) Modeling of the boot sector structure for (file system1) based on (file system2)
(Filesystem1) Filesystem1
(Filesystem2) Filesystem2
(BytesPerSector) Sector size in bytes: Parameter that has the original (IN) value
(Value1_2) and possibly receives a new (OUT) value and a new format (Value1_1) through conversion according to the access rule (BS1)
Further parameters or characteristics of the file system:
(SectorPerCluster) Number of sectors per cluster
(ClusterPerVolume) Number of clusters per drive
(VolumeLabel) Drive label
(Etc)-Etc.
(FSPropertyN) Property N of the file system: Another parameter on the (File system2), which has the original (IN) value (ValueN_2) and possibly a new (OUT) value and a new format (ValueN_1)
(IN) initial value
(ValueN) Value N
(Rule) rule, access rule (BS2, BS3 etc.)
(Out) end value
(BSMemberN)
(AV) Available Availability notice for sectors reserved in (206). (EMPTY) means 'not held up'-(AV) means 'held up'
(Last) Last: the position of the reserved sector
(324) Modeling of the directory data
(StateNow) Current status: current status of the FAT on the file system 1
(StateNow-1) Previous state of the FAT on file system 1, possibly unknown, not yet initialized state.
(Directory, Filesystem 1) Directory structure on the file system 1 (modeled)
(Directory, Filesystem2) Directory structure on the file system2
(File1 . . . FileN) File 1 . . . File N: File names of the file objects
(Ext1 . . . ExtN) Extension 1 . . . Extension N: file object extensions
(Size1 . . . SizeN) Size 1 . . . Size N: Size of the file objects
(Sc1 . . . ScN) Start cluster 1 . . . Start cluster N: the first cluster of the file in terms of the FAT. This value is modeled for file system 1 according to (402).
(Nc1ofN) Next cluster 1 of N: the following cluster 1 on N
(M+1) the next free position in FAT on the (file system 1)
(402) This method models FAT structures on file system1 for files requested by file system2. As a result, the placement of the files on file system1 is not initially fragmented.
(402a) Start the iterative process "Read the contents of the root directory" of (filesystem2)
(402b) Determine if starting clusters are defined for the iterated content.
(402c) Modeling of (file system1) over the area with iterated content
(402d) End the iterative process "Read contents of root directory" of (filesystem2)
(405) Qualification of the changes to the FAT
(StateNow) Current status: Current status of the FAT on the file system1
(StateNow-1) Previous state of the FAT on the file system1
(ScN) Start cluster N: the first cluster of the file in terms of FAT N
(Nc1ofN) Next cluster 1 of N: the following cluster 1 on N
(LcofN) Last cluster of N: the last cluster on N
(Free) free: unoccupied sector
(M+1) the next free position in FAT on the (file system1)
(Last) last sector: the position of the reserved sector
(QualifiedDifferenceFAT) evaluation, i.e. the result of qualifying these changes: The difference between (StateNow) and (StateNow-1) can be described as a new chain for "Create_a_new_file"; the new chain should start at cluster (K+M+1) and be 19 sectors (L) long.
(406) Qualification of changes to the directory structure
(StateNow) Current status: Current status of the directory structure on the file system1
(StateNow-1) Actual state 1: Original state of the directory structure on the file system1
(File1), (File2), (File3), (FileN) File 1, File 2 . . . File N: File names of the file objects, according to the entries in the directory structure, from 1 to N
(Ext1), (Ext2), (Ext3), (ExttN) Extension 1 . . . Extension N: File object extensions, according to the entries in the directory structure, from 1 to N
(Size1), (Size2), (Size3), (SizeN) Size 1 . . . Size N: Size of the file objects, according to the entries in the directory structure, from 1 to N
(Sc1), (Sc2), (Sc3), (ScN), (ScN+1) Start cluster values of the file objects, corresponding to the entries in the directory structure, from 1 to N+1
(QualifiedDifferenceDir) Result of the qualification of these changes: The difference between (StateNow) and (StateNow-1) can be described as a new-file-operation; the new file has the name XXX with the extension ABC, starts at (SCN+1) and has a length of 19*512 bytes.

(404) Determination of the affiliation of user data to the files
(ScN) Start cluster N: the first cluster of the file in terms of FAT N
(Nc1ofN) Next cluster 1 of N: the following cluster 1 on N
(LcofN) Last cluster of N: the last cluster on N
(M+1) the next free position in FAT on the (file system1)
(Free) free: unoccupied sector
(Last) last sector: the position of the reserved sector
(Range) Range: sectors occupied by the file system
(Filesystem1) Filesystem 1
(OFFSET) Offset: in addition to the segment portion, the second component (integer value) in a memory address
(Size1) Size 1: Size of the file object
(File1_fs2) File 1 on file system 2
(File1_fs2) File 1 on file system 2
(Ext1), (Ext2), (Ext3), (ExttN) Extension 1 . . . Extension N: file object extensions,
(Size1), (Size2), (Size3), (SizeN) Size 1 . . . Size N: Size of the file object
(File1), (File2), (File3), (FileN) File 1 . . . File N: File names of the file objects

What is claimed is:

1. A method for dynamically establishing a compatibility of file systems and access to data independent of the file system in real time, comprising:
   granting access (100) to the file system of a passive data memory for an active terminal and a modeling device (M) which is communicatively connected between the passive data memory and the active terminal;
   receiving (101) an access request from the active terminal by the modeling device (M), wherein the access request specifies access data and access operations to the passive data memory;
   recognizing (102) the file system of the passive data memory by the modeling device (M);
   selecting (103) stored access rules which are suitable for carrying out the access request in accordance with the recognized (102) file system of the passive data memory, wherein the access rules are selected such that a table is provided, which describes in the first column the file system of the active terminal, in the second column the file system of the passive data memory and a third column provides a pointer, which points to respective access rules;
   applying (104) the selected access rules to access data by the modeling device (M), which are specified by the access request; and
   performing (105) the access operations in accordance with the access request.

2. The method of claim 1, wherein the granting of access (100) comprises a recognition of boot sectors, a mount process, an integration of the passive data memory in the modeling device (M), an integration of the passive data carrier in the active terminal, communicative coupling, establishing at least one plug connection, activating access, setting up access rights and/or data communication.

3. The method of claim 1, wherein the active terminal has an operating system which generates the access request.

4. The method of claim 3, wherein the applying (104) and performing (105) is carried out iteratively for each data stream, the operating system defining the data stream.

5. The method of claim 1, wherein the access request comprises at least one read and/or write request.

6. The method of claim 1, wherein the access request specifies payload data and/or additional data.

7. The method of claim 1, wherein access data describe file names, absolute memory addresses, relative memory addresses, file types and/or file properties.

8. The method of claim 1, wherein access operations describe read and/or write operations.

9. The method of claim 1, wherein the access rules describe modulation operations which specify how additional data of access data are to be modeled so that the access data are to be read and/or written according to the file system.

10. The method of claim 1, wherein access rules describe how to write data according to a first file system in a second file system and/or read from a second file system.

11. The method of claim 1, wherein recognizing (102) the file system comprises a recognition of boot sectors.

12. The method of claim 1, wherein performing (105) the write operations according to the access request, when a file size is limited by the file system, divides a corresponding file into at least two individual files.

13. A system arrangement for dynamic establishment of compatibility of file systems and access to data in real time independent of the file system, comprising:
   at least one interface unit arranged to grant access (100) to the file system of a passive data memory for an active terminal, and a modeling device (M) which is communicatively connected between the passive data memory and the active terminal;
   the modeling device (M) arranged to receive (101) an access request from the active terminal, the access request specifying access data and access operations to the passive data memory;
   the modeling device (M) set up to recognize (102) the file system of the passive data carrier;
   a database unit arranged to select (103) stored access rules which are suitable for carrying out the access request in accordance with the recognized (102) file system of the passive data memory, wherein the access rules are selectable such that a table is provided, which describes in the first column the file system of the active terminal, in the second column the file system of the passive data memory and a third column provides a pointer, which points to respective access rules;
   the modeling device (M) arranged to apply (104) the selected access rules to access data which are specified by the access request; and
   the passive data memory arranged to carry out (105) the access operations in accordance with the access request.

14. A computer program product comprising a non-transitory storage medium containing control commands which carry out the method of claim 1 when they are executed on a computer.

* * * * *